United States Patent [19]

Kubo

[11] Patent Number: 4,958,909

[45] Date of Patent: Sep. 25, 1990

[54] METHOD OF ADJUSTING LIGHT SOURCE POSITION IN CONVERGENCE DEVICE EMPLOYING SPHEROIDAL MIRROR

[75] Inventor: Nobuhiko Kubo, Hino, Japan

[73] Assignee: Yamashita Denso Corporation, Tokyo, Japan

[21] Appl. No.: 443,309

[22] Filed: Nov. 30, 1989

[51] Int. Cl.[5] .................. G02B 5/10

[52] U.S. Cl. .................. 350/320; 350/630

[58] Field of Search .................. 350/320, 600, 629, 630; 362/296, 341, 347

[56] References Cited

U.S. PATENT DOCUMENTS

| | | | |
|---|---|---|---|
| 1,466,410 | 8/1923 | Pascucci | 350/630 |
| 3,191,026 | 6/1965 | Perret | 362/296 |
| 3,257,574 | 6/1966 | McLintic | 350/630 |
| 3,266,313 | 8/1966 | Litterst | 350/630 |
| 3,745,325 | 7/1973 | Harvey | 350/630 |
| 3,768,900 | 10/1973 | McLintic | 350/629 |
| 4,041,344 | 8/1977 | LaGiusa | 362/296 |
| 4,814,956 | 3/1989 | Kano | 350/320 |

OTHER PUBLICATIONS

Webster's Dictionary, definitions of "ellipsoidal, spheroidal".

New Encyclopedia Britannica (16th Ed., 1986), "ellipsoid".

*Primary Examiner*—Bruce Y. Arnold

*Assistant Examiner*—Ryan

*Attorney, Agent, or Firm*—Armstrong, Nikaido, Marmelstein, Kubovcik & Murray

[57] ABSTRACT

A method of adjusting a light source position in a convergence device is employed for a convergence device having a spheroidal mirror and a discharge tube disposed within the spheroidal mirror, such that the vicinity of a tip of a cathode of the discharge tube is generally aligned with a first focal point of the spheroidal mirror whereby light from the discharge tube converges at a second focal point, and wherein two peep holes are provided in the spheroidal mirror at locations corresponding to a plane surface including the first focal point and perpendicular to an optical axis of the spheroidal mirror, wherein in said peep holes are offset by 90 degrees with respect to one another in the plane surface. The method includes the steps of projecting light from a point source or an optical fiber light guide from the second focal point toward the spheroidal mirror, such that the projected light converges at the first focal point, when the discharge tube is off, observing the projected light and the discharge tube through the two peep holes, and adjusting the position of the discharge tube based upon the observed position of the projected light and the discharge tube from the two peep holes, such that the vicinity of the tip of the cathode of the discharge tube is aligned with the first focal point.

2 Claims, 2 Drawing Sheets

METHOD OF ADJUSTING LIGHT SOURCE POSITION IN CONVERGENCE DEVICE EMPLOYING SPHEROIDAL MIRROR

BACKGROUND OF THE INVENTION

This invention relates to a method of adjusting the position of a light source in a convergence device employing a spheroidal mirror, wherein the convergence device is used, for example, in an exposure apparatus, a solar simulator, or the like.

A conventional method of this kind, is shown in FIG. 7, in which a discharge tube c is arranged such that the vicinity of the tip e of its cathode d is positioned at a first focal point b of a spheroidal mirror a so that light from the discharge tube c is made to converge at a second focal point f of the spheroidal mirror a. The discharge tube c is illuminated and at the same time a blackboard h is positioned in a plane at right angles to the optical axis g, wherein the plane includes the second focal point f. Then the discharge tube c is moved and adjusted so that the light form the discharge tube c is made to converge on the second focal point f marked on the blackboard h.

However, the conventional method described above has disadvantages in that the discharge tube itself has to be moved and adjusted by examining the blackboard from an angle with respect to the optical axis of the spheroidal mirror which is illuminated by a light of high brightness from the discharge tube so that the light from the discharge tube is focused on the second focal point. Because this adjustment has to take place from an angle, it is difficult to focus accurately on the second focal point without considerable training. Further, at the same time an extinction filter must be positioned for eye protection from a light of high brightness. Additionally, it is impossible to adjust the position of the discharge tube in the type of integrator lens optics in which light from the discharge tube is received on an integrator lens.

SUMMARY OF THE INVENTION

This invention has for its object to provide a method of eliminating the foregoing disadvantages of the conventional method. According to the instant invention, there is provided a method wherein a discharge tube is positioned such that the vicinity of the tip of a cathode is aligned with a first focal point of a spheroidal mirror so that the light from said discharge tube is made to converge on a second focal point of the spheroidal mirror. In the instant invention two peep holes are provided in the spheroidal mirror at an interval of 90 degrees in a plane surface including the first focal point, wherein the plane surface is at right angles to the optical axis. The discharge tube is switched off and at the same time light from a point source or from a optical light guide is introduced at the second focal point, and there by caused to converge at the first focal point. By looking thought the peep holes, the discharge tube is moved and adjusted so that the vicinity of the tip of the cathode is aligned with the first focal point.

According to another embodiment of the instant invention there is provided a method wherein a discharge tube is positioned such that the vicinity of the tip of a cathode is aligned with a first focal point of a spheroidal mirror so that the light from the discharge tube is made to converge at a second focal point of the spheroidal mirror. In this embodiment, two peep holes are provided in the spheroidal mirror at an interval of 90 degrees in a plane surface including said first focal point, wherein the plane surface is at right angles to the optical axis. A plane mirror is then provided parallel to the plane surface and located between the first focal point on said optical axis and the second focal points. A point source of light is arranged symmetrically and opposite to said second focal point with respect to said plane mirror. The discharge tube is switched off and at the same time light from the point source is made to reflect from the plane mirror to thereby cause the light to converge at said first focal point. Thus, by looking through the peep holes, the discharge tube may be moved and adjusted so that the vicinity of the tip of the cathode is aligned with the first focal point.

According to the methods described above the discharge tube is moved and adjusted by focusing on the first focal point a low-intensity light beam from a point light source which is introduced at the second focal point of a spheroidal mirror or reflected from a plane mirror, or from a fiber light guide. The discharge tube is thus adjusted while looking through two peep holes which are provided in the spheroidal mirror at an interval of 90 degrees at right angles to the optical axis, such that the vicinity of the tip of the cathode is aligned with a first focal point, the first focal point having maximum brightness of light when the discharge tube is switched on. When the adjustment has been made in this manner, if the light from the point source or the fiber light guide is removed, and the discharge tube is switched on, the light beam from the discharge tube can be accurately focused on the second focal point of the spheroidal mirror.

Thus according to this invention, because the discharge tube can be moved and adjusted by looking at right angles to the optical axis, so that the vicinity of the tip of the cathode of the discharge tube is aligned with the first focal point adjustment is easier and more accurate than the conventional method in which the discharge tube is moved and adjusted by looking at a diagonal angle with respect to the optical axis so that the light from the discharge tube is focused on a second focal point marked on a blackboard. Further, this invention has other advantages in that because the adjustments can be made by using a light beam from a point light source introduced at the second focal point or from a fiber light guide while the discharge tube is switched off, it is not necessary to install an extinction filter as was required in the method of prior art in which adjustment was made with the discharge tube switched on, and in that, through use of reflection on a plane mirror, it is possible to apply the invention to an integrator lens optical device in which a second focal point cannot be structurally obtained.

BRIEF DESCRIPTION OF THE DRAWINGS

The advantages of the invention will become apparent in the following description taken in conjunction with the drawings, wherein.

DETAILED DESCRIPTION OF THE PREFERRED EMBODIMENT

The invention will now be explained with reference to the attached drawings.

Figure 1:
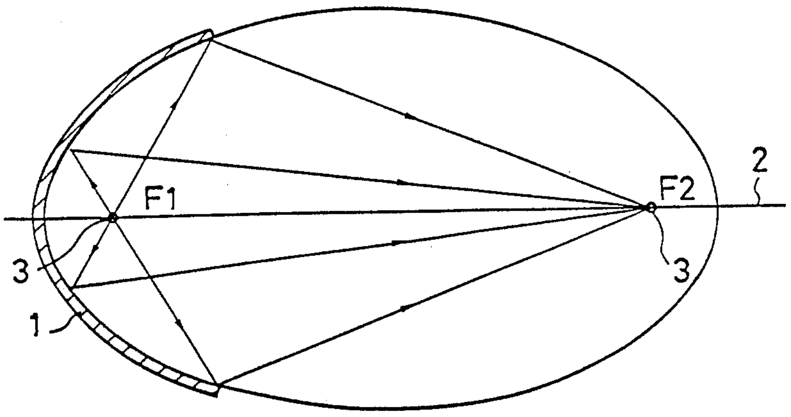
FIG. 1 is a diagram illustrating the principles of convergence of a spheroidal mirror optical device.

FIG. 1 is a diagram showing the principle of convergence of light in an optical device having a spheroidal mirror 1. A point source of light 3 is arranged at a first focal point position F1 on the optical axis 2 of spheroidal mirror 1. When this light source is illuminated, the emitted light beams always converge at a second focal point position F2. Furthermore, accordingly, when a point source of light 3 is arranged at the second focal point position F2 and illuminated emitted light beams always converge at the first focal point position F1.

The instant invention uses the principle of convergence described above to provide a simple and accurate method of adjusting the position of a light source.

Figure 2:
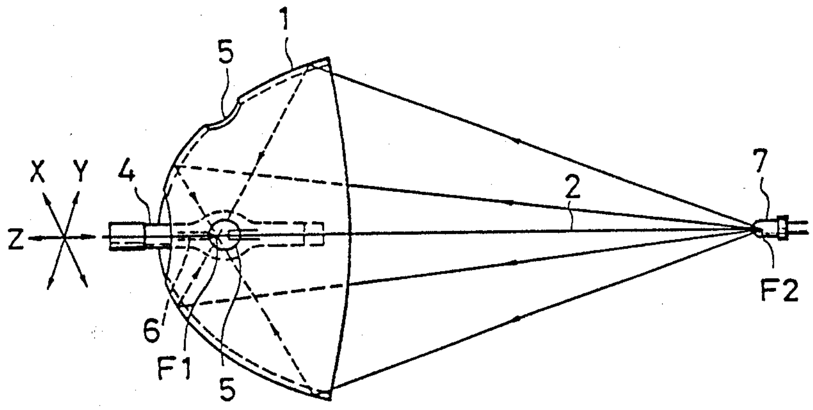
FIG. 2 is a schematic diagram of a first embodiment of the instant invention.
Figure 3:
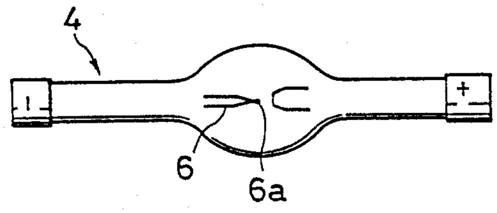
FIG. 3 is a diagram showing the configuration of lamp electrodes of a discharge tube.
Figure 4:
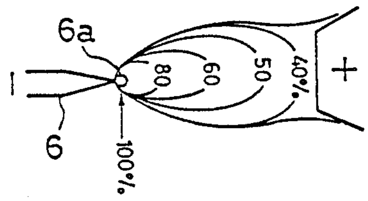
FIG. 4 is an explanatory diagram showing the distribution of the intensity of light emitted from the discharge tube.

FIG. 2 shows an embodiment of this invention, where a short arc discharge tube 4 of a direct current switch type is provided at first focal point F1. The discharge tube 4 has an electrode configuration as shown in FIG. 3 and a diffused brightness of emitted light as shown in FIG. 4. The discharge tube 4, for example, could be a xenon lamp or a metal halide lamp. This, in an optical device with discharge tube 4, light from switched on discharge tube 4 is made to converge at the second focal point position F2, and the position of the discharge tube 4 can be adjusted.

In this case, the arrangement and dimensions of the optical device are determined in conformance with the basic design specifications of the spheroidal mirror 1. Further, in a plane which includes the first focal point position F1 and which is at right angles to the optical axis 2, the spheroidal mirror 1 is provided with two peep holes 5, 5 at an interval of 90 degrees.

The discharge tube 4 employed should preferably be movable for adjustment so that the vicinity of the tip *6a* of its cathode 6 is aligned with the first focal point position F1, this is because the light brightness is at its maximum at the tip *6a* of the cathode 6. Specifically, a discharge tube 4 of high-brightness, which is held on an X-Y-Z platform, is placed in the vicinity of the first focal point position F1. At the same time a point light source 7 of low brightness is place at the second focal point position F2. the discharge tube 4 is switched off and then the point source 7 is switched on. The light from the point source 7 is made to converge at the first focal point position F1. While looking through the peep hole 5, 5 at light beam and the tip *6a* or the vicinity of the cathode 6 of the discharge tube 4, the X-Y-Z platform is moved for adjustment of the location of the discharge tube 4 so that the tip *6a*, or its vicinity, is aligned with the first focal point position F1 at which light from point source 7 is being focused.

In the adjustment described above, because the adjustment is made by looking from two direction at an interval of 90 degrees orthogonal with respect to the optical axis 2 of the spheroidal mirror 1, even an unskilled person can easily and accurately adjust the device. Furthermore, because the adjustment is performed by looking at the light of low brightness from the point light source 7 with the discharge tube 4 switched off, it is not necessary to install an extinction filter. After adjustment, the point light source 7 is removed and the discharge tube 4 is switched on, the light from the discharge tube 4 is focused accurately on the second focal point position F2, and the device can be used in an exposure apparatus of the like.

Figure 5:
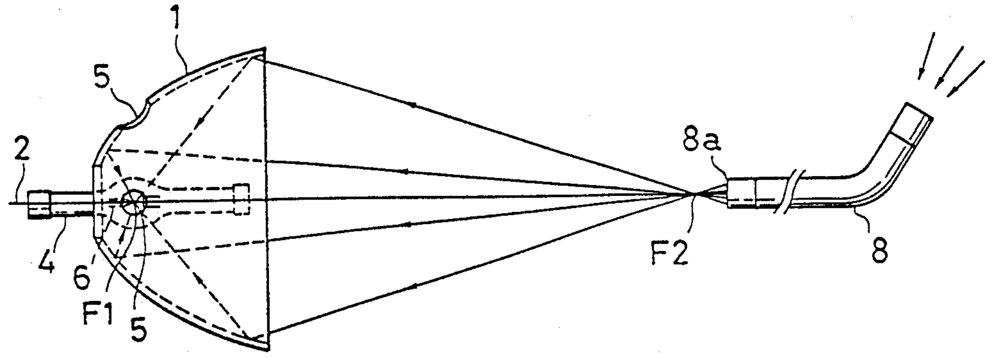
FIG. 5 is a schematic diagram of a second embodiment of the instant invention.

FIG. 5 shows another embodiment in which a discharge tube 4 is arranged at the first focal point position F1 of a spheroidal mirror 1, and light from the discharge tube 4 which is switched on is received by an optical fiber light guide whose tip 8A is separated by only an effective diameter thereof from the second focal point position F2. Thus the resulting optical device uses this light as a light source for a lighting device, and thus provides a method for adjusting the position of the discharge tube 4. In this case, by introducing light from the tip *8a* of the fiber light guide 8 onto the second focal point position F2, it is possible to obtain the same effect and advantages of the embodiment of FIG. 2, in which a point light source 7 is placed on the second focal point position F2.

Figure 6:
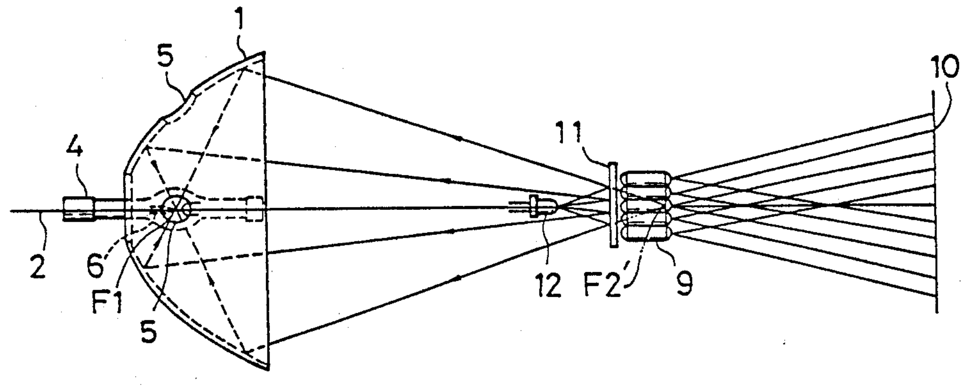
FIG. 6 is a schematic diagram of a third embodiment of the instant invention.
Figure 7:
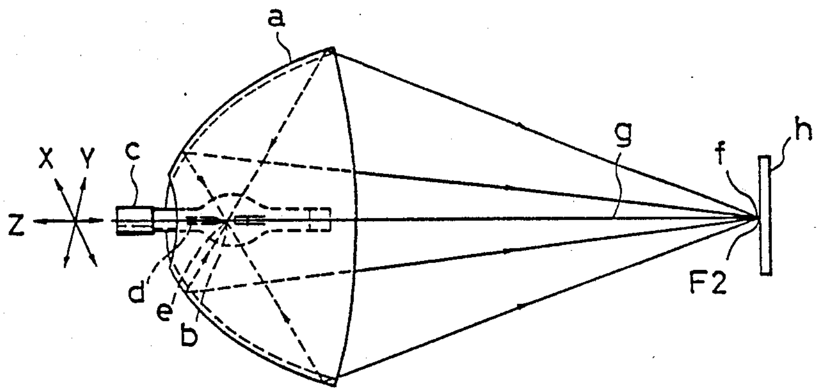
FIG. 7 is a schematic diagram of a conventional example.

FIG. 6 shows an embodiment of adjusting the position of a discharge tube 4 in an optical device wherein the discharge tube 4 is placed at the first focal position F1 of a spheroidal mirror 1, and the light from the discharge tube 4, which is switched on, is received on an integrator lens 9, giving an effect such that the light is evenly reflected on a radiation surface 10.

In this case, because the second focal point position F2 is structurally impossible to obtain, a plane mirror 11 is provided at right angles to the optical axis 2 between the first focal point position F1 and the second focal point position F2′ obtained in design. A light source 12 such as a light-emitting diode or a miniature lamp, is placed symmetrically with the second focal point position F2′ with respect to the plane mirror 11. By reflecting the light from the switched on light source 12 on the plane mirror 11, and making those light beams converge at the first focal point position F1, the same effect and advantages of the embodiment of this invention described in FIG. 2, which has a point light source 7 at the second focal point position F2, can be obtained.

Although specific forms of embodiments of the instant invention have been described above and illustrated in the accompanying drawings, the above description is made by way of example and not as a limitation to the scope of the instant invention. It is contemplated that various modifications apparent to one of ordinary skill in the art could be made without departing form the scope of the invention which is to be determined by the following claims.

I claim:

1. A method of adjusting a light source position in a convergence device having a spheroidal mirror and a discharge tube disposed within said spheroidal mirror, such that the vicinity of a tip of a cathode of the discharge tube is generally aligned with a first focal point of the spheroidal mirror whereby light from the discharge tube converges at a second focal point, and wherein two peep holes are provided in the spheroidal mirror at locations corresponding to a plane surface including said first focal point and perpendicular to an optical axis of the spheroidal mirror, wherein in said peep holes are offset by 90 degrees with respect to one another in said plane surface, said method including the steps of:

projecting light from a point source or an optical fiber light guide from said second focal point toward said spheroidal mirror, such that said projected light converges at said first focal point, when said discharge tube is off;

observing said projected light and said discharge tube through said two peep holes; and adjusting the position of the discharge tube based upon the observed position of the projected light and the discharge tube from said two peep holes, such that the vicinity of the tip of the cathode of the discharge tube is aligned with said first focal point.

2. A method of adjusting a light source position in a convergence device having a spheroidal mirror and a discharge tube disposed within said spheroidal mirror, such that the vicinity of a tip of a cathode of the discharge tube is generally aligned with a first focal point of the spheroidal mirror whereby light from the discharge tube converges at a second focal point, and wherein two peep holes are provided in the spheroidal mirror at locations corresponding to a plane surface including said first focal point and perpendicular to an optical axis of the spheroidal mirror, wherein in said peep holes are offset by 90 degrees with respect to one another in said plane surface, said method including the steps of:

providing a plane mirror generally parallel to said plane surface at a position between said first and second focal points on said optical axis;

projecting light from a point source, positioned symmetrical and opposite to said second focal point with respect to said plane mirror, onto said plane mirror such that reflected light from said plane mirror is reflected toward said spheroidal mirror and therefore converges at said first focal point, when said discharge tube is off;

observing said projected light and said discharge tube through said two peep holes; and adjusting the position of the discharge tube based upon the observed position of the projected light and the discharge tube from said two peep holes, such that the vicinity of the tip of the cathode of the discharge tube is aligned with said first focal point.

* * * * *